United States Patent [19]

Yacobovitch

[11] Patent Number: 5,484,243
[45] Date of Patent: Jan. 16, 1996

[54] CARRIAGE AND RELEASE MECHANISM FOR AIRBORNE STORE

[75] Inventor: Yacov Yacobovitch, Kiryat Motzkin, Israel

[73] Assignee: State of Israel-Ministry of Defense Armament Development Authority-Rafael, Haifa, Israel

[21] Appl. No.: 285,686

[22] Filed: Aug. 4, 1994

[30] Foreign Application Priority Data

Aug. 5, 1993 [IL] Israel .................................. 106607

[51] Int. Cl.⁶ .......................... F16B 19/00; F16B 21/18
[52] U.S. Cl. .......................... 411/353; 411/348; 411/354; 411/999
[58] Field of Search ........................... 411/20, 265, 267, 411/270, 348, 352, 353, 354, 970, 999

[56] References Cited

U.S. PATENT DOCUMENTS

| | | | |
|---|---|---|---|
| 3,405,593 | 10/1968 | Kriesel | 411/267 X |
| 3,793,685 | 2/1974 | Knecht | 411/348 X |
| 4,929,135 | 5/1990 | Delarue et al. | 411/267 X |
| 5,160,233 | 11/1992 | McKinnis | 411/267 X |
| 5,221,171 | 6/1993 | Rudoy et al. | 411/267 X |
| 5,248,233 | 9/1993 | Webster | 411/267 X |
| 5,282,709 | 2/1994 | Chaput et al. | 411/270 X |

*Primary Examiner*—Neill R. Wilson
*Attorney, Agent, or Firm*—Mark M. Friedman

[57] ABSTRACT

A mechanism for enabling an aircraft to carry and release a store featuring a hanger. The hanger has a hollow portion which is formed with a circumferential inner recess. A circular spring ring with a diameter which is smaller than the diameter of the inner recess, is dimensioned to fit within the inner recess of the hanger and to fit completely within the inner recess when a sufficient outward radial force is exerted upon it. The mechanism further includes a cylinder which fits within the hollow portion of the hanger. When the portion of the spring ring engages the outer recess of the cylinder, the hanger and the cylinder, and, therefore, the store and the carrier, are securely connected to each other. A slidable plunger having wings near one of its ends is used for pushing the spring ring into the inner recess of the hanger. The mechanism includes a mechanism for bringing about the forceful sliding of the plunger toward the store so as to cause the wings of the plunger to force the spring ring radially outward into the inner recess of the hanger, thereby allowing the hanger to disconnect from the cylinder, and causing the store to separate from the carrier.

7 Claims, 2 Drawing Sheets

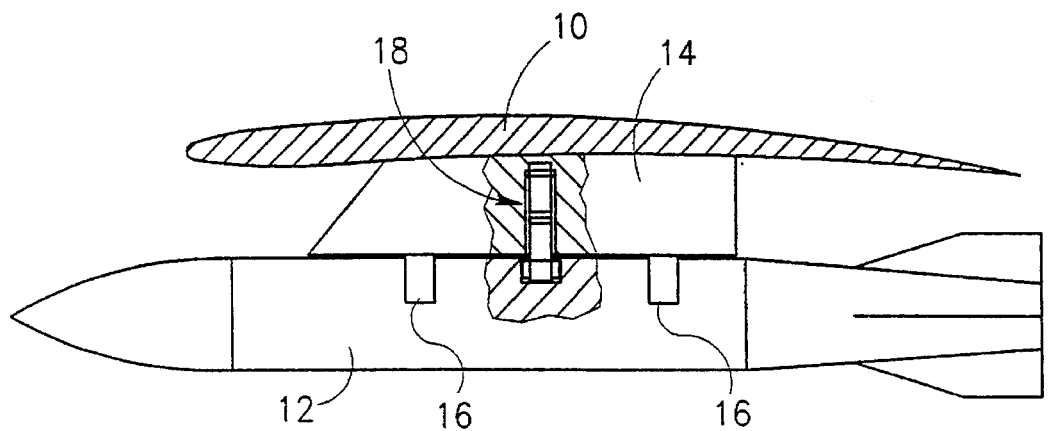
FIG.1
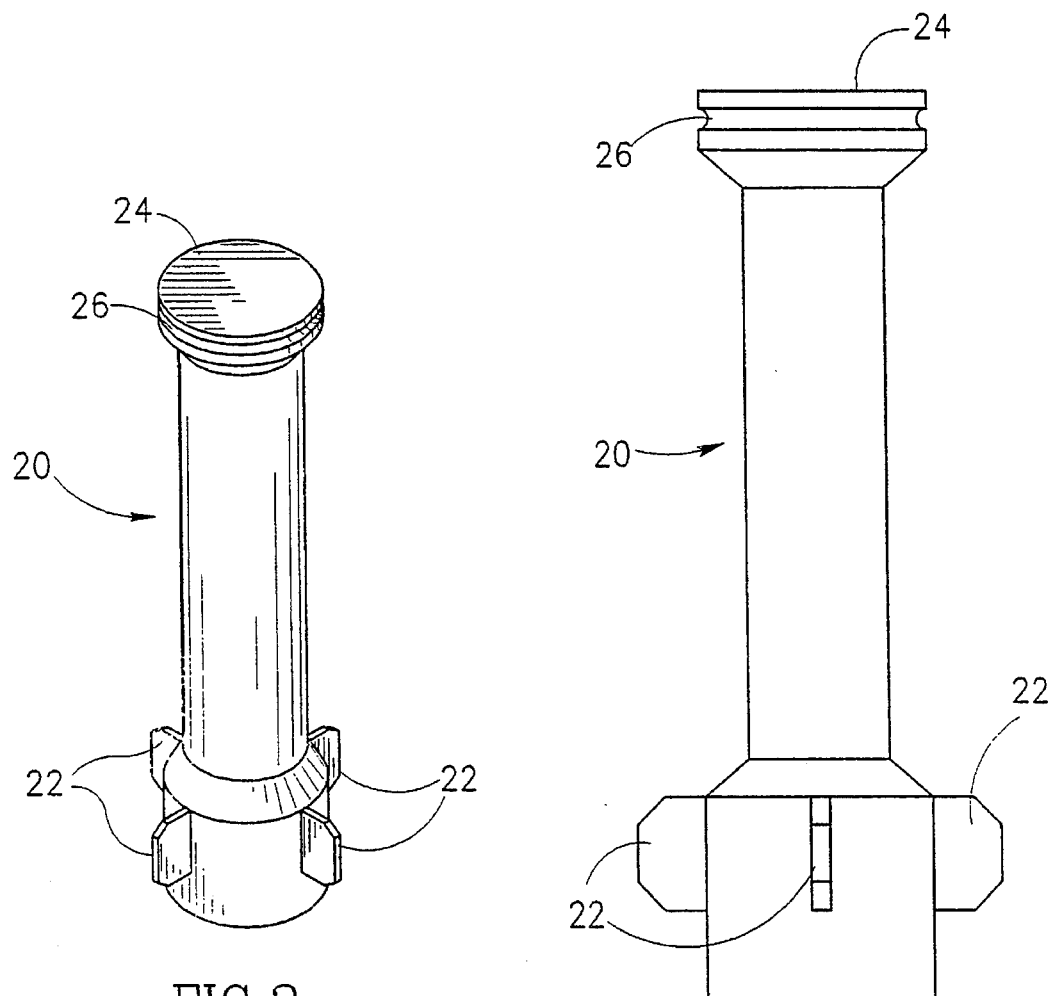
FIG.2
FIG.3

CARRIAGE AND RELEASE MECHANISM FOR AIRBORNE STORE

FIELD AND BACKGROUND OF THE INVENTION

The present invention relates to mechanisms for releasing and ejecting externally carried loads, or stores, such as, for example, the release and ejection of an air to ground missile from an aircraft.

A variety of quick release mechanisms are available which are capable of retaining a load, or store (hereinafter "store"), until such time as it is desired to release the store. One of many possible applications for such a mechanism is in the carrying and releasing of external stores carried by aircraft, for example, a missile or bomb carried by a combat aircraft. In such applications, the store may at times be released while the aircraft is traveling at very high speeds and/or changing speed and bearing.

An effective mechanism for separating the store from the aircraft must be simple, reliable and quick-acting. Furthermore, in order to avoid the possibility of the store staying in close proximity to the aircraft following its release and possibly colliding with the aircraft as a result of aerodynamic loads or other factors, it is further desirable to ensure that the separation between the aircraft and the store is clean, which can normally be accomplished by ejecting the store, i.e., by imparting to the store a certain downward force upon release, or soon thereafter, to give the store a downward velocity component which is larger than would have been case through the effect of gravity alone.

SUMMARY OF THE INVENTION

According to the present invention, there is provided a mechanism for carrying a store by, and for releasing and ejecting the store from, a carrier, comprising: (a) a hanger connected to the store, the hanger having a hollow portion which is formed with a substantially circumferential inner recess; (b) a spring ring dimensioned to fit within the inner recess of the hanger, the spring ring being substantially circular and having a diameter which is smaller than the diameter of the inner recess, the spring ring being dimensioned to fit completely within the inner recess when a sufficient outward radial force is exerted upon it; (c) a cylinder connected to the carrier, the cylinder being at least partially hollow, one end of the cylinder being dimensioned to fit within the hollow portion of the hanger and having a substantially circumferential outer recess for accommodating at least a portion of the spring ring, so that when the portion of the spring ring engages the outer recess of the cylinder the hanger and the cylinder, and therefore the store and the carrier, are securely connected to each other; (d) a plunger slidable within the hollow cylinder, the plunger having a plurality of wings near one of its ends for pushing the spring ring into the inner recess of the hanger, the wings resting between the spring ring and the carrier when the store is securely carried by the carrier; and (e) forcing means for bringing about the forceful sliding of the plunger toward the store so as to cause the wings of the plunger to force the spring ring radially outward into the inner recess of the hanger, thereby allowing the hanger to disconnect from the cylinder, allowing the store to separate from the carrier.

According to further features in preferred embodiments of the invention described below, the forcing means and the plunger are such that, following the forcing of the spring ring into the inner recess of the hanger, the plunger proceeds to impact on the hanger, serving to eject the hanger and the store from the cylinder and the carrier.

According to still further features in the described preferred embodiments, the plunger is dimensioned so that, after impacting on the hanger, the plunger separates from the hanger.

The present invention successfully addresses the shortcomings of the presently known configurations by providing a mechanism for securely carrying a store and for subsequently quickly, reliably and cleanly releasing and ejecting the store, which has applications in various contexts including, but not limited to, the handling of external stores, such as bombs and missile, by an aircraft acting the carrier.

BRIEF DESCRIPTION OF THE DRAWINGS

The invention is herein described, by way of example only, with reference to the accompanying drawings, wherein:

FIG. 1 is a side view in partial cross section of a typical application of a device according to the present invention in the carrying and releasing of an external store by an aircraft;

FIG. 2 is an isometric view of a portion of a device according to the present invention;

FIG. 3 is a side view of the portions of the device shown in FIG. 2;

DESCRIPTION OF THE PREFERRED EMBODIMENTS

Figures 4, 5:
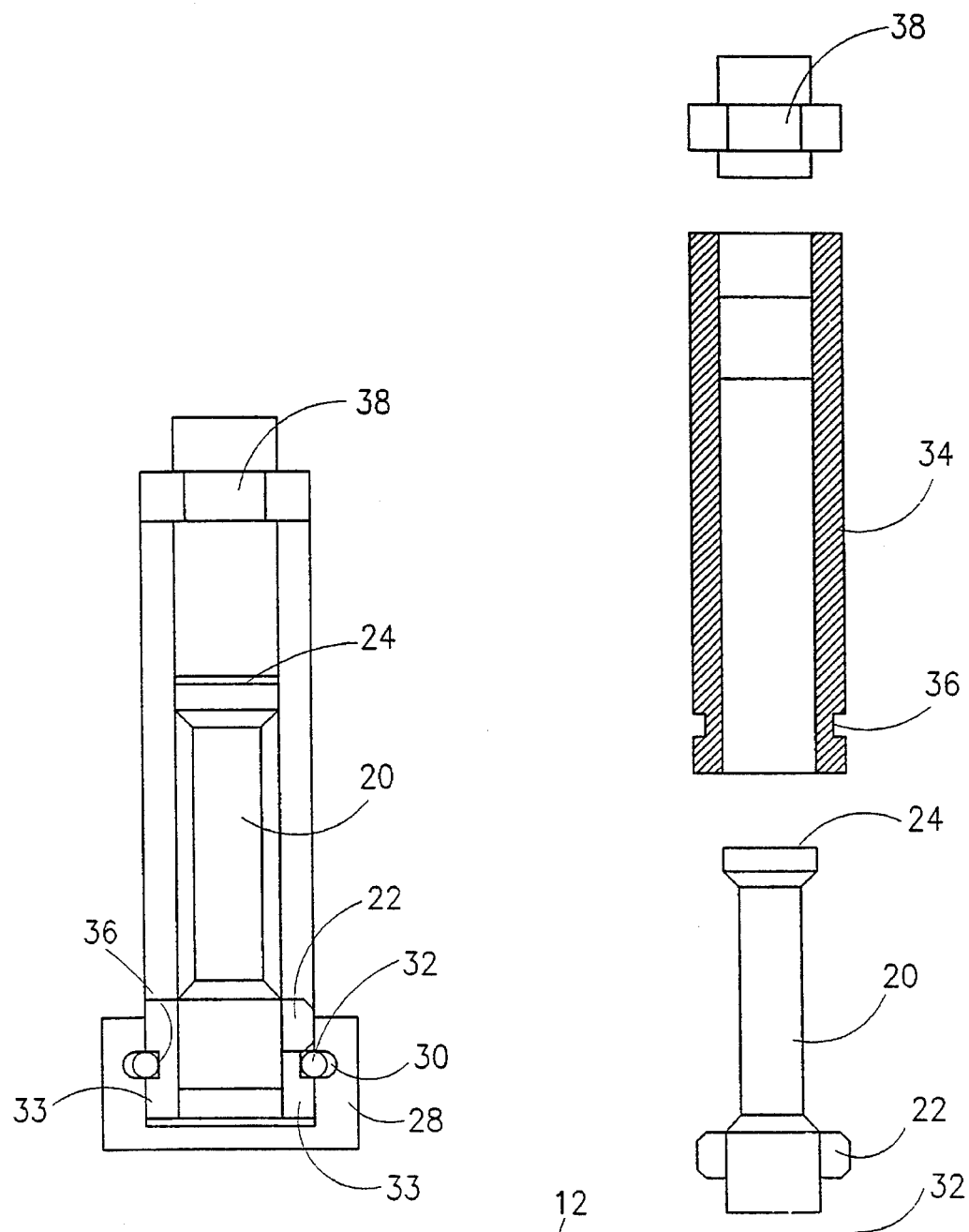
FIG. 4 is a side cross sectional view of a device according to the present invention.
FIG. 5 is a side cross-sectional exploded view of a device according to the present invention.

The present invention is of a device for retaining and subsequently releasing and ejecting a store, such as an external store of a combat aircraft.

The principles and operation of a device according to the present invention may be better understood with reference to the drawings and the accompanying description.

Referring now to the drawings, FIG. 1 illustrates a mechanism according to the present invention as it might be implemented in the context of an aircraft which carries a releasable external store. Depicted in FIG. 1 in cross-section is a portion of an aircraft, which may be the fuselage or a wing 10, which serves as the carrier of a store 12, which is illustrated in FIG. 1 as being a bomb. Typically, store 12 is not connected directly to fuselage or wing 10 but is, instead, connected to a suitable pylon 14 which is, in turn, rigidly connected to fuselage or wing 10. Typically, pylon 14 features one or more sway braces 16 which are not positively connected to store 12 but which are shaped and positioned to maintain store 12 at a fixed orientation relative to the aircraft prior to its release.

Store 12 is connected to pylon 14 of fuselage or wing 10 through a device or mechanism 18 according to the present invention which is revealed in the partial cross sectional view of FIG. 1 and which is discussed in more detail below.

Mechanism 18 is made up of a number of components, one of which is a plunger 20 shown in isometric view in FIG. 2 and in side view in FIG. 3.

Plunger 20 includes near one of its ends a plurality of radially outwardly projecting wings 22 which are connected to, or are integrally formed with, plunger 20. Preferably, each of wings 22 include one or more portions which are ramped or slanted, for purposes which are explained below.

At its end away from wings 22, plunger 20 preferably includes a piston-like structure 24 and preferably also includes, near the same end, a groove 26 which is capable of accommodating an o-ring (not shown) which serves as a seal so as to maximize the effectiveness of piston-like structure 24, especially when explosives are used to cause the movement of plunger 20, as describe below.

An example of a complete device according to the present invention is shown as it would appear when the store is being securely supported in FIG. 4 and in exploded view in FIG. 5.

A device according to the present invention includes a hanger 28 which is at least partially hollow, with the hollow portion being formed with a substantially circumferential inner recess 30. Hanger 28 is securely connected, as by screwing or welding, and the like, to store 12, depicted by cross-hatched lines in FIG. 5.

A device according to the present invention further includes a spring ring 32 which is dimensioned to fit within inner recess 30 of hanger 28. Spring ring 32 is substantially circular with the circle formed by spring ring 32 having a diameter which is somewhat smaller than the diameter of the circle formed by inner recess 30 of hanger 28. Spring ring 32 is further dimensioned to fit completely within inner recess 30 of hanger 28 whenever a sufficient outward radial force is exerted upon it, as described below.

A device according to the present invention also includes a cylinder 34 which is at least partially hollow and which is securely connected to the carrier. One end of cylinder 34 is dimensioned to fit within the hollow portion of hanger 28 and has a substantially circumferential outer recess 36 which is dimensioned to accommodate at least a portion of spring ring 32 in such a way that, when the portion of spring ring 32 engages outer recess 36 of cylinder 34, hanger 28 and cylinder 34, and therefore store 12 and the carrier, are securely connected to each other.

As described above, a device according to the present invention, in addition, includes plunger 20 which is slidable within the hollow portion of cylinder 34. Wings 22 of plunger 20 are designed for pushing spring ring 32 into inner recess 30 of hanger 28. When store 12 is securely carried by the carrier, wings 22 rest between spring ring 32 and the carrier, as shown in FIG. 4. Wings 22 are able to slide within axially directed slots 33 (FIG. 4) in cylinder 34.

Finally, a device according to the present invention includes suitable forcing means 38 for bringing about the forceful sliding of plunger 20 toward store 12 so as to cause wings 22 of plunger 20 to slide into contact with spring ring 32, in the process forcing spring ring 32 radially outward into inner recess 30 of hanger 28, the forcing preferably facilitated by the presence of sloping walls on wings 22, as shown in FIG. 2–5. The displacement of spring ring 32 into inner recess 30 of hanger 28 removes spring ring 32 from outer recess 36 of cylinder 34, which removes the sole means of attachment and support of store 12 to the carrier and thereby allows hanger 28 to disconnect from cylinder 34, which allows store 12 to separate from the carrier.

Preferably, a mechanism according to the present invention includes forcing means 38 and plunger 20 which are designed such that, immediately following the forcing of spring ring 32 into inner recess 30 of hanger 28, plunger 20 proceeds to impact on hanger 28, serving to eject, or thrust downwardly, hanger 28 and, therefore, store 12, from cylinder 34 and the carrier.

Any suitable forcing means 38 may be used, including, but not limited to, forcing means 38 which includes an appropriate explosive charge, a biasing mechanism, such as a spring or a suitable electrical motor.

Preferably, plunger 20 is so dimensioned that, after impacting on hanger 28, plunger 20 separates from hanger 28, which is advantageous since the permanent attachment of plunger 20 to hanger 28 could adversely alter the aerodynamic properties of store 12 and detract from its accuracy. One way of providing for the separation of plunger 20 from hanger 28 is by ensuring, through proper dimensioning of plunger 20 and hanger 28, that wings 22 are not able to go past spring ring 32 thereby allowing plunger 20 to get locked into hanger 28.

In operation, store 12 suitably connected to hanger 28 having inner recess 30 and spring ring 32, are brought to the carrier which features a connected cylinder 34 and forcing means 38. Cylinder 34 and hanger 28 are forced together with plunger 20 positioned inside cylinder 34. The forcing of cylinder 34 and hanger 28 together serves to place spring ring 32 partially within outer recess 36 of cylinder 34 so as to securely connect cylinder 34 and hanger 28 and, therefore, the carrier and store 12.

In this condition the carrier and store 12 can remain securely connected indefinitely. When it is time to release and eject store 12, forcing means 38 is activated in some suitable fashion which depends on the nature of forcing means 38, causing plunger 20 to slide down the inside of cylinder 34. Wings 22 of plunger 20 force spring ring 32 into inner recess 30 of hanger 28, thereby disconnecting cylinder 34 from hanger 28, and the carrier from store 12. Plunger 20 then continues to move downward, striking hanger 28 and imparting a certain downward force to hanger 28, and store 12, to effect an ejection of store 12, resulting in a clean separation between the carrier and store 12.

While the invention has been described with respect to a single preferred embodiment, it will be appreciated that many variations, modifications and other applications of the invention may be made.

What is claimed is:

1. A mechanism for carrying a store by, and for releasing and ejecting the store from, a carrier, comprising:

(a) a hanger connected to the store, said hanger having a hollow portion which is formed with a substantially circumferential inner recess;

(b) a spring ring dimensioned to fit within said inner recess of said hanger, said spring ring being substantially circular and having a diameter which is smaller than the diameter of said inner recess, said spring ring being dimensioned to fit completely within said inner recess when a sufficient outward radial force is exerted upon it;

(c) a cylinder connected to the carrier, said cylinder being at least partially hollow, one end of said cylinder being dimensioned to fit within said hollow portion of said hanger and having a substantially circumferential outer recess for accommodating at least a portion of said spring ring, so that when said portion of said spring ring engages said outer recess of said cylinder said hanger and said cylinder, and therefore the store and the carrier, are securely connected to each other;

(d) a plunger slidable within said hollow cylinder, said plunger having a plurality of wings near one of its ends for pushing said spring ting into said inner recess of said hanger; and (e) forcing means for bringing about the forceful sliding of said plunger toward the store so as to cause said wings of said plunger to force said spring ting radially outward into said inner recess of said hanger, thereby allowing said hanger to disconnect from said cylinder, allowing the store to separate from the carrier.

2. A mechanism as in claim 1, wherein said forcing means and said plunger are such that, following the forcing of said spring ring into said inner recess of said hanger, said plunger proceeds to impact on said hanger, serving to eject said hanger and the store from said cylinder and the carrier.

3. A mechanism as in claim 2, wherein said plunger is dimensioned so that, after impacting on said hanger, said plunger separates from said hanger.

4. A mechanism as in claim 1, wherein said cylinder is formed with a plurality of axially extending slots for accommodating said wings of said plunger.

5. A mechanism as in claim 1, wherein said wings of said plunger include a slanted surface to facilitate the forcing of said spring ring radially outward into said inner recess of said hanger.

6. A mechanism as in claim 1, wherein said hanger includes store connecting means for connecting said hanger to the store.

7. A mechanism as in claim 1, wherein the end of said plunger away from said wings includes a piston for facilitating the forcing of said plunger toward the store.

\* \* \* \* \*